United States Patent
Oshima et al.

(10) Patent No.: US 7,339,005 B2
(45) Date of Patent: Mar. 4, 2008

(54) PROCESS FOR PRODUCING MODIFIED DIENE POLYMER RUBBER

(75) Inventors: Mayumi Oshima, Ichihara (JP); Seiichi Mabe, Ichihara (JP); Katsunari Inagaki, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 345 days.

(21) Appl. No.: 10/740,670

(22) Filed: Dec. 22, 2003

(65) Prior Publication Data

US 2004/0152845 A1 Aug. 5, 2004

(30) Foreign Application Priority Data

| Jan. 31, 2003 | (JP) | ............................. 2003-023910 |
| Feb. 27, 2003 | (JP) | ............................. 2003-050755 |
| Feb. 27, 2003 | (JP) | ............................. 2003-050756 |
| Mar. 26, 2003 | (JP) | ............................. 2003-085102 |
| Apr. 15, 2003 | (JP) | ............................. 2003-109967 |

(51) Int. Cl.
*C08C 19/22* (2006.01)
*C08C 19/25* (2006.01)
*C08F 136/04* (2006.01)
*C08F 236/04* (2006.01)

(52) U.S. Cl. ................... 525/331.9; 525/332.9; 525/342; 525/374; 525/375; 525/379; 525/383

(58) Field of Classification Search ............. 525/331.9, 525/342, 332.9, 374, 375, 379, 383
See application file for complete search history.

(56) References Cited

U.S. PATENT DOCUMENTS

| 5,189,109 | A |   | 2/1993 | Imai et al. |
| 5,916,961 | A | * | 6/1999 | Hergenrother et al. ...... 524/572 |
| 6,160,054 | A |   | 12/2000 | Schwindeman et al. |
| 6,469,106 | B2 |  | 10/2002 | Inagaki et al. |
| 2002/0077429 | A1 | | 6/2002 | Inagaki et al. |

FOREIGN PATENT DOCUMENTS

| EP | 0 767 179 A2 | * | 4/1997 |
| EP | 0 890 587 A1 |  | 1/1999 |
| JP | 5-46365 B2 |  | 7/1993 |
| JP | 7-196715 A |  | 8/1995 |
| JP | 2540901 B2 |  | 7/1996 |
| JP | 2002-128824 A |  | 5/2002 |
| JP | 2003-171404 A |  | 6/2003 |

OTHER PUBLICATIONS

M.J. Stewart et al., "Anionic Functional Initiators. 1: 3-Dimethylaminopropyllithium as an Initiator for the Synthesis of Bi- and Difunctional Polybutadines", *British Polymer Journal*, vol. 22, 1990, pp. 319-325.

* cited by examiner

*Primary Examiner*—Roberto Rabago
(74) *Attorney, Agent, or Firm*—Sughrue Mion, PLLC

(57) ABSTRACT

There is provided a process for producing a both end-modified diene polymer rubber comprising the steps of:
(1) polymerizing a conjugated diene monomer or a combination thereof with an aromatic vinyl monomer in the presence of a compound represented by the following formula (1) to produce an alkali metal end-carrying active polymer, and
(2) reacting the alkali metal end-carrying active polymer with an amine compound, a ketone compound, an acrylamide compound, a heterocyclic compound or a silyl compound represented by specific formulas, respectively:

$$R-(CH_2)_n-X-M \qquad (1)$$

wherein R is a functional group containing a substituent group-carrying nitrogen atom, X is a saturated or unsaturated hydrocarbon group comprising from 0 to 10 conjugated diene monomer units or aromatic vinyl monomer units, n is an integer of from 1 to 10, and M is an alkali metal.

15 Claims, No Drawings

PROCESS FOR PRODUCING MODIFIED DIENE POLYMER RUBBER

FIELD OF THE INVENTION

The present invention relates to a process for producing a both end-modified diene polymer rubber having superior impact resilience. The polymer rubber obtained according to said process is most suitable for motor car tires having superior fuel cost saving.

BACKGROUND OF THE INVENTION

A styrene-butadiene copolymer obtained by emulsion polymerization is known as rubber used for motorcar tires. However, said copolymer has a problem that motorcar tires comprising said copolymer are not satisfactory from a viewpoint of fuel cost saving, because the copolymer does not have sufficient impact resilience.

In order to obtain rubber having superior impact resilience, JP-B 5-46365 discloses a process, which comprises copolymerizing butadiene and styrene in a hydrocarbon solvent using an organolithium compound as an initiator, and a Lewis base such as ether as a microstructure-controlling agent.

Further, Japanese Patent No. 2540901 proposes a process, which comprises the step of reacting an alkali metal bound at the end of a diene polymer rubber with a specific acrylamide to obtain a modified diene polymer rubber having improved impact resilience.

Furthermore, JP-A 2002-128824 discloses a process, which comprises the step of reacting an alkali metal bound at the end of a diene polymer rubber with a specific amine to obtain a modified diene polymer rubber having improved impact resilience and processability.

However, in recent years, a level demanded for fuel cost saving of motorcar tires is higher from an environmental view point, and therefore, any of the above-mentioned copolymer rubbers can hardly satisfy such a demand.

SUMMARY OF THE INVENTION

An object of the present invention is to provide a process for producing a modified polymer rubber having superior impact resilience.

The present invention is a process for producing a both end-modified diene polymer rubber comprising the steps of:

(1) polymerizing a conjugated diene monomer or a combination thereof with an aromatic vinyl monomer in the presence of a compound represented by the following formula (1) to produce an alkali metal end-carrying active polymer, and (2) reacting the alkali metal end-carrying active polymer with an amine compound, a ketone compound, an acrylamide compound, a heterocyclic compound or a silyl compound represented by the following formulas (2) to (6), respectively,

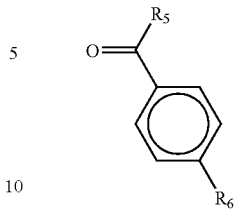

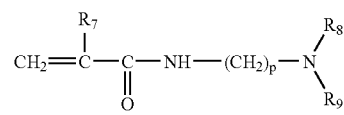

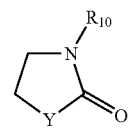

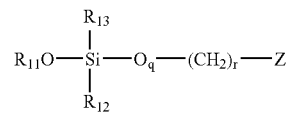

wherein, in the formula (1), R is a functional group containing a substituent group-carrying nitrogen atom, X is a saturated or unsaturated hydrocarbon group comprising from 0 to 10 conjugated diene monomer units or aromatic vinyl monomer units, n is an integer of from 1 to 10, and M is an alkali metal; in the formula (2), each of $R_1$, $R_2$ and $R_3$ is independently of each other an alkyl group having from 1 to 8 carbon atoms, $R_4$ is an alkoxy or alkyl group having from 1 to 8 carbon atoms, and a is an integer of from 1 to 8; in the formula (3), $R_5$ is an alkyl group having from 1 to 8 carbon atoms, an alkoxy group having from 1 to 8 carbon atoms, a phenyl group or a benzyl group, and $R_6$ is a cyclic amino group containing a substituent group-carrying nitrogen atom; in the formula (4), $R_7$ is hydrogen or a methyl group, each of $R_8$ and $R_9$ is independently of each other an alkyl group, and p is an integer of from 1 to 10; in the formula (5), $R_{10}$ is an alkyl group having from 1 to 4 carbon atoms, an alkoxyalkyl group, a phenyl group or a benzyl group, and Y is a nitrogen, oxygen or sulfur atom having a substituent group of an alkyl group having from 1 to 4 carbon atoms, an alkoxyalkyl group, a phenyl group or a benzyl group; and, in the formula (6), $R_{11}$ is an alkyl group having from 1 to 4 carbon atoms, a cycloalkyl group, a phenyl group or a benzyl group, each of $R_{12}$ and $R_{13}$ is independently of each other an alkyl group having from 1 to 4 carbon atoms, an alkoxy group, an alkoxyalkyl group, a cycloalkyl group, a phenyl group or a benzyl group, q is an integer of from 0 to 1, r is an integer of from 1 to 5, and Z is a halogen, an epoxy group or a vinyl group.

The present invention is also a rubber composition comprising:

(1) from 10 to 100 parts by weight of a both end-modified diene polymer rubber produced by the process according to the above-mentioned process, (2) from 0 to 90 parts by weight of other rubber, (3) from 0 to 100 parts by weight of carbon black, (4) from 5 to 100 parts by weight of silica, and (5) from 0 to 20% by weight of a silane coupling agent, wherein the total amount of the components (1) and (2) is 100 parts by weight, and the amount of the component (5) is based on the amount of the component (4).

A term "monomer unit" contained in a term such as "conjugated diene monomer unit" means a unit of a polymerized monomer such as a unit of a polymerized conjugated diene monomer.

DETAILED DESCRIPTION OF THE INVENTION

Examples of a conjugated diene monomer in the present invention are 1,3-butadiene, isoprene, 1,3-pentadiene (piperylene), 2,3-dimethyl-1,3-butadiene and 1,3-hexadiene. Among them, 1,3-butadiene or isoprene is preferable from a viewpoint of availability and physical properties of a modified polymer rubber obtained.

Examples of an aromatic vinyl monomer in the present invention are styrene, α-methylstyrene, vinyltoluene, vinylnaphthalene, divinylbenzene, trivinylbenzene and divinylnaphthalene. Among them, styrene is preferable from a viewpoint of availability and physical properties of a modified polymer rubber obtained.

In the above formula (1), a preferable R is an N,N-dimethylamino group, an N,N-diethylamino group, an N,N-dipropylamino group, an N,N-dibutylamino group, a morpholino group or an imidazole group.

In the formula (1), X is a saturated or unsaturated hydrocarbon group comprising from 0 to 10, and preferably from 1 to 5 conjugated diene monomer units or aromatic vinyl monomer units, from a viewpoint that a molecular weight of a compound represented by the formula (1) is not too large (accordingly, said compound is not used in a too much amount). When said number is less than 1, namely, 0 (zero), said compound associates strongly with each other in a solvent, and therefore, solubility of said compound in a hydrocarbon solvent is poor, and as a result, a polymerization rate of a conjugated diene monomer or a combination thereof with an aromatic vinyl monomer may be slow. A particularly preferable X in the formula (1) is a saturated or unsaturated hydrocarbon group comprising two isoprene monomer units, in view of excellent solubility in a hydrocarbon solvent of the compound represented by the formula (1).

In the formula (1), n is an integer of from 1 to 10, and preferably from 3 to 10 from a viewpoint that (i) a compound represented by the formula (1) can be easily produced, and (ii) polymerization of a conjugated diene monomer or a combination thereof with an aromatic vinyl monomer can be easily controlled.

Examples of M in the formula (1) are Li, Na, K and Cs. Among them, Li is preferable in view of good solubility of the compound represented by the formula (1) in a hydrocarbon solvent.

Examples of the compound represented by the formula (1) are 3-(N,N-dimethylamino)-1-propyllithium, 3-(N,N-diethylamino)-1-propyllithium 3-(N,N-dipropylamino)-1-propyllithium, 3-(N,N-dibutylamino)-1-propyllithium, 3-morpholino-1-propyllithium, 3-imidazole-1-propyllithium, and a compound (oligomer) containing 1 to 10 butadiene units, isoprene units or styrene units, which compound (oligomer) is obtained by polymerizing butadiene, isoprene or styrene with the above-mentioned respective compounds. Among them, 3-(N,N-dimethylamino)-1-propyllithium, or an active saturated or unsaturated hydrocarbon obtained by polymerizing two isoprene monomer units with 3-(N,N-dimethylamino)-1-propyllithium is preferable, from a viewpoint that (i) an active polymer having a narrow molecular weight distribution is obtained at a rapid reaction rate, and (ii) the obtained polymer has remarkably improved fuel cost saving. Among them, from an industrial point of view, further preferred is the active saturated or unsaturated hydrocarbon obtained by polymerizing two isoprene monomer units with 3-(N,N-dimethylamino)-1-propyllithium, which hydrocarbon has excellent solubility in a hydrocarbon solvent.

When using both the conjugated diene monomer and the aromatic vinyl monomer in the above-mentioned step (1) in the present invention, a ratio by weight of the former monomer to the latter monomer, namely, a ratio of conjugated diene monomer/aromatic vinyl monomer, is preferably from 50/50 to 90/10, and further preferably from 55/45 to 85/15. When said ratio is less than 50/50, the obtained active polymer is insoluble in a hydrocarbon solvent, and as a result, a homogeneous polymerization in said step maybe impossible. When said ratio is more than 90/10, strength of the obtained active polymer may be low.

A polymerization method in the step (1) is not particularly limited, and may be a conventional one. In said step, it is permitted to use conventional solvents and additives usually used in the art such as hydrocarbon solvents; randomizers; and additives used for controlling a content of a vinyl bond (which bond is derived from the conjugated diene monomer) contained in the active polymer obtained.

The above-mentioned hydrocarbon solvent is that, which does not deactivate the compound represented by the formula (1). Suitable examples thereof are aliphatic hydrocarbons, aromatic hydrocarbons and alicyclic hydrocarbons. Particularly preferable examples thereof are those having 2 to 12 carbon atoms. Specific examples thereof are propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene, and a combination of at least two thereof.

As the above-mentioned additives used for controlling a content of a vinyl bond, Lewis basic compounds are exemplified. As said compounds, an ether or a tertiary amine is preferable from a viewpoint of industrial availability.

Examples of the above-mentioned ethers are cyclic ethers such as tetrahydrofuran, tetrahydropyran and 1,4-dioxane; aliphatic mono ethers such as diethyl ether and dibutyl ether; aliphatic diethers such as ethylene glycol dimethyl ether, ethylene glycol diethyl ether, ethylene glycol dibutyl ether, diethylene glycol diethyl ether and diethylene glycol dibutyl ether; and aromatic ethers such as diphenyl ether and anisole.

Examples of the above-mentioned tertiary amines are triethylamine, tripropylamine, tributylamine, N,N,N',N'-tetramethylethylenediamine, N,N-diethylaniline, pyridine and quinoline.

Preferable amine compounds represented by the above formula (2) are those, wherein each of $R_1$ and $R_2$ is a methyl group; $R_3$ is a methyl group, an ethyl group, a propyl group or a butyl group; $R_4$ is a methoxy group, an ethoxy group, a propoxy group or a butoxy group; and a is 1.

Examples of said amine compound are 1,1-dimethoxytrimethylamine, 1,1-diethoxytrimethylamine, 1,1-di-n-propoxytrimethylamine, 1,1-di-iso-propoxytrimethylamine, 1,1-di-n-butoxytrimethylamine, 1,1-di-tert-butoxytrimethylamine, 1,1-diethoxytriethylamine, 1,1-di-n-propoxytriethylamine, 1,1-di-iso-propoxytriethylamine, 1,1-di-n-butoxytriethylamine and 1,1-di-tert-butoxytriethylamine. Among them, 1,1-dimethoxytrimethylamine having a low molecular weight is preferable, because fuel cost saving can be remarkably improved by adding a small amount of said amine compound.

The amine compound is used in an amount of generally from 0.1 to 10 mol, and preferably from 0.5 to 2 mol per 1 mol of the active polymer. When said amount is less than 0.1 mol, improvement of fuel cost saving is small. When said amount is more than 10 mol, the amine compound remains unreacted in the solvent, which is not preferable from an economical viewpoint, because an additional step of separating the amine compound from the solvent is required when recycling the solvent for reuse.

A preferable $R_5$ in the formula (3) is a methyl group, an ethyl group, a propyl group, a butyl group, a methoxy group, an ethoxy group, a propoxy group, a butoxy group, a phenyl group or a benzyl group in view of reactivity.

Examples of $R_6$ in the formula (3) are nitrogen atom-containing cyclic amino groups derived from morpholine, imidazoline, imidazole, pyrazole, oxazine, thiazine, oxazole, thiazole, pyridine, pyrimidine and pyrazine, respectively. Among them, that derived from morpholine or imidazole is preferable in view of improvement of fuel cost saving.

Examples of the compound represented by the formula (3) are 4-morpholinoacetophenone, 4-morpholinobenzophenone, 4'-(imidazol-1-yl)-acetophenone, 4'-(imidazol-1-yl)-benzophenone, 4-pyrazolylacetophenone and 4-pyrazolylbenzophenone. In view of remarkable improvement of fuel cost saving, 4-morpholinobenzophenone, 4-morpholinoacetophenone or 4'-(imidazol-1-yl)-acetophenone is preferable.

An amount of the ketone compound used and its reason are the same as those of the above-mentioned amine compound. Each of $R_7$ to $R_9$ in the formula (4) is preferably a group having from 2 to 4 carbon atoms in view of improvement of fuel cost saving.

In the formula (4), p is preferably an integer of from 2 to 5. When p is more than 5, a molecular weight of an acrylamide compound represented by the formula (4) is too high, and as a result, a large amount of the acrylamide compound is used.

Examples of the compound represented by the formula (4) are N,N-dimethylaminomethylacrylamide, N,N-ethylmethylainomethylacrylamide, N,N-diethylaminomethylacrylamide, N,N-ethylpropylaminomethylacrylamide, N,N-dipropylaminomethylacrylamide, N,N-butylpropylaminomethylacrylamide, N,N-dibutylaminomethylacrylamide, N,N-dimethylaminoethylacrylamide, N,N-ethylmethylaminoethylacrylamide, N,N-diethylaminoethylacrylamide, N,N-dimethylaminoethylacrylamide, N,N-ethylpropylaminoethylacrylamide, N,N-dipropylaminoethylacrylamide, N-butylpropylaminoethylacrylamide, N,N-dibutylaminoethylacrylamide, N,N-dimethylaminopropylacrylamide, N,N-ethylmethylaminopropylacrylamide, N,N-diethylaminopropylacrylamide, N,N-ethylpropylaminopropylacrylamide, N,N-dipropylaminopropylacrylamide, N,N-butylpropylaminopropylacrylamide, N,N-dibutylaminopropylacryla mide, N,N-dimethylaminobutylacrylamide, N,N-ethylmethylaminobutylacrylamide, N,N-diethylaminobutylacrylamide, N,N-ethylpropylaminobutylacrylamide, N,N-dipropylaminobutylacrylamide, N,N-butylpropylaminobutylacrylamide and N,N-dibutylaminobutylacrylamide, and compounds obtained by changing the term "acrylamide" thereof to "methacrylamide". Among them, N,N-dimethylaminopropylacrylamide is preferable in view of remarkable improvement of fuel cost saving.

An amount of the acrylamide compound used and its reason are the same as those of the above-mentioned amine compound.

$R_{10}$ in the formula (5) is preferably an alkyl group having from 1 to 4 carbon atoms in view of improvement of fuel cost saving due to a small amount thereof.

Y in the formula (5) is preferably a nitrogen, atom substituted with an alkyl group having from 1 to 4 carbon atoms in view of improvement of fuel cost saving.

Examples of the compound represented by the formula (5) are 1,3-dimethyl-2-imidazolidinone, 1,3-diethyl-2-imidazolidinone, 1,3-dipropyl-2-imidazolidinone, 1,3-dibutyl-2-imidazolidinone, 3-methyl-2-oxazolidinone, 3-ethyl-2-oxazolidinone, 3-propyl-2-oxazolidinone, 3-butyl-2-oxazolidinone, 3-methyl-2-thiazolidinone, 3-ethyl-2-thiazolidinone, 3-propyl-2-thiazolidinone and 3-butyl-2-thiazolidinone. Among them, 1,3-dimethyl-2-imidazolidinone is preferable in view of remarkable improvement of fuel cost saving.

An amount of the heterocyclic compound used and its reason are the same as those of the above-mentioned amine compound.

In view of improvement of fuel cost saving, $R_{11}$ in the formula (6) is preferably an alkyl group having 1 to 4 carbon atoms, and each of $R_{12}$ and $R_{13}$ therein is preferably an alkoxy group having from 1 to 4 carbon atoms. The r in the formula (6) is preferably an integer of 2 or 3, because (i) fuel cost saving can be improved by using a small amount of the compound represented by the formula (6), and (ii) the compound represented by the formula (6) is stable.

Z in the formula (6) is preferably an epoxy group in view of improvement of fuel cost saving.

Examples of the compound represented by the formula (6) are 2-glycidoxyethyltrimethoxysilane, 3-glycidoxypropyltrimethoxysilane, 4-glycidoxybutyltrimethoxysilane, 2-trimethoxysilylethylchloride, 3-trimethoxysilylpropylchloride, 4-trimethoxysilylbutylchloride, 2-trimethoxysilylethylbromide, 3-trimethoxysilylpropylbromide, 4-trimethoxysilylbutylbromide and vinyltrimethoxysilane. Among them, 3-glycidoxypropyltrimethoxysilane is preferable in view of remarkable improvement of fuel cost saving.

An amount of the silyl compound used and its reason are the same as those of the above-mentioned amine compound.

The reaction of the step (2) proceeds rapidly. As a preferable method for contacting reactants in said step, there can be exemplified a method of adding the amine compound to a reaction mixture obtained in the step (1). Reaction temperature thereof is generally from ambient temperature to 80° C., and a reaction time is generally from several seconds to several hours.

In view of kneading processability of the modified polymer rubber obtained, it is possible to add a coupling agent represented by the following formula to the active polymer before or after the step (2):

wherein R' is an alkyl group, an alkoxy group, an aryl group, an alkenyl group, a cycloalkenyl group or an aromatic hydrocarbon group; M' is a silicon or tin atom; X' is a halogen atom; b is an integer of from 0 to 2; and c is an integer of from 2 to 4.

The above-mentioned coupling agent is added in an amount of usually from 0.005 to 0.4 mol, and preferably from 0.01 to 0.3 mol, per 1 mol of the active polymer. When the amount is less than 0.005 mol an improvement of kneading processability of the modified polymer rubber is small. When the amount is more than 0.4 mol, a proportion of the active polymer reacting with the amine compound is small, and as a result, an improvement of fuel cost saving is small, and also, viscosity of the solution may be very high.

The modified polymer rubber contained in the reaction mixture obtained in the step (2) can be solidified according to a solidifying method, which is usually used for producing rubber by a solution polymerization method, such as (i) a method of adding a coagulant, and (ii) a method of adding steam. A solidifying temperature is not particularly limited.

The solidified modified polymer rubber is dried with a drier such as a band drier and an extrusion type drier, which are commonly used in a synthetic rubber production. A drying temperature is not particularly limited.

Mooney viscosity ($ML_{1+4}$) of the obtained modified polymer rubber is preferably from 10 to 200, and further preferably from 20 to 150. When said viscosity is less than 10, mechanical properties such as tensile strength of vulcanized rubber thereof may decrease. When said viscosity is more than 200, miscibility may be so poor when using said modified polymer rubber as a component of a rubber composition in combination with other components such as other rubber that it may be difficult to produce said rubber composition, and as a result, mechanical properties of a vulcanized rubber composition thereof may deteriorate.

A content of the vinyl bond, which is derived from the conjugated diene monomer, and is contained in the obtained modified polymer rubber, is preferably from 10 to 70%, and further preferably from 15 to 60%. When said content is less than 10%, a glass transition temperature of the modified polymer rubber may be lowered, and as a result, a grip performance of tires comprising the modified polymer rubber may deteriorate. When said content is more than 70%, a glass transition temperature of the modified polymer rubber maybe elevated, and as a result, an impact resilience of the modified polymer rubber may deteriorate.

The obtained modified polymer rubber can be used in combination with other components such as other rubber and various additives.

Examples of the other rubber are styrene-butadiene copolymer rubber obtained by an emulsion polymerization method; polybutadiene rubber, butadiene-isoprene copolymer rubber and styrene-butadiene copolymer rubber obtained by a solution polymerization method using a catalyst such as an anion polymerization catalyst and a Ziegler type catalyst; natural rubber; and a combination of at least two thereof.

A proportion of the modified polymer rubber contained in a rubber composition comprising said modified polymer rubber and other rubber is preferably not less than 10% by weight, and more preferably not less than 20% by weight, wherein a total of the both is 100% by weight. When said proportion is less than 10% by weight, the impact resilience of the obtained rubber composition may hardly be improved, and also processability thereof is not good.

A kind and an amount of the above-mentioned additives can be determined depending upon purposes of using the obtained rubber composition. Examples of the additives usually employed in a rubber industry are vulcanizing agents such as sulfur; stearic acid; zinc white; thiazol type vulcanization accelerators; vulcanization accelerators such as thiuram type vulcanization accelerators and sulfenamide type vulcanization accelerators; organic peroxides; reinforcing agents such as carbon black, for example, HAF carbon black and ISAF carbon black; silica; fillers such as calcium carbonate and talc; extender oils; processing co-agents; and antioxidants.

The rubber composition according to the present invention comprises preferably from 30 to 90 parts by weight of silica, and from 0 to 40 parts by weight of carbon black in view of balance between a wet skid resistance and a rolling resistance. The silane coupling agent contained in the rubber composition enhances bonding strength between silica and the rubber components, and therefore, an abrasion resistance is improved. When the amount of the silane coupling agent is more than 20% by weight, a higher coupling rate can be obtained, however, properties can not be improved in proportion to the amount thereof. In view of dispersion efficiency of silica and the coupling effect, the amount of the silane coupling agent is preferably from 2 to 15% by weight.

As the above-mentioned silane coupling agent, there can be used any silane coupling agent, which has been conventionally used in combination with silica filler. Examples of the silane coupling agent are bis(3-triethoxysilylpropyl)tetrasulfide, bis(3-triethoxysilylpropyl)disulfide, 3-mercaptopropyltrimethoxysilane, bis(2-triethoxysilyl)tetrasulfide, bis(3-trimethoxysilylpropyl)tetrasulfide, bis(3-trimethoxysilylpropyl)disulfide, bis(2-trimethoxysilylethyl)tetrasulfide and 3-mercaptopropyltriethoxysilane. Among them, in view of adding effect of the coupling agent, preferred is bis(3-triethoxysilylpropyl)tetrasulfide, bis(3-triethoxysilylpropyl)disulfide or 3-mercaptopropyltrimethoxysilane.

A process for producing the above-mentioned rubber composition is not limited. An example thereof is a process comprising the step of mixing respective components in a mixer known in the art such as a roll and a Bambury mixer. The obtained rubber composition is usually vulcanized, and is used as a vulcanized rubber composition.

Since the modified polymer rubber obtained by the process in accordance with the present invention is superior in impact resilience and processability, a rubber composition comprising said modified polymer rubber is most suitable for automobile tires having superior fuel cost saving. Said rubber composition can also be employed for uses such as a sole for shoes, floor materials and vibration proof rubber.

EXAMPLES

The present invention is explained with reference to the following Examples, which are not intended to limit the scope of the present invention.

Example 1

A 20 liter-inner volume stainless steel polymerization reactor was washed and dried, and thereafter, was purged with dry nitrogen. Successively, 11.2 mmol of an active saturated or unsaturated hydrocarbon obtained by polymerizing two isoprene monomer units with 3-(N,N-dimethylamino)-1-propyllithium (AI-200 CE, produced by FMC Lithium, cyclohexane solution), 1420 g of 1,3-butadiene, 580 g of styrene, 324 g of tetrahydrofuran and 10.2 kg of hexane were introduced therein, and polymerization was carried out at 65° C. for 3 hours under stirring.

To the obtained polymerization reaction mixture, 0.4 mmol of tin tetrachloride (coupling agent) was added, and reaction was continued for 30 minutes at 65° C. under stirring. To the obtained reaction mixture, 9.6 mmol of 1,1-dimethoxytrimethylamine (amine compound) was added, and reaction was further continued for 30 minutes at 65° C. under stirring.

To the obtained reaction mixture, 10 ml of methanol was added, and stirring was further continued at 65° C. for 5 minutes. The obtained reaction mixture was taken out and mixed with 10 g of 2,6-di-t-butyl-p-cresol, a trade name of SUMILIZER BHT, manufactured by Sumitomo Chemical Co., Ltd. Thereafter, most of hexane was evaporated, and successively, the remainder was dried under reduced pressure at 55° C. for 12 hours, thereby obtaining a polymer rubber modified on its both ends.

Example 2

Example 1 was repeated to obtain a polymer rubber modified on its both ends, except that (1) the added amount of the active saturated or unsaturated hydrocarbon obtained by polymerizing two isoprene monomer units with 3-(N,N-dimethylamino)-1-propyllithium (AI-200CE, producedby-FMC Lithium, cyclohexane solution) was changed to 10.3 mmol, and (2) the added amount of 1,1-dimethoxytrimethylamine (amine compound) was changed to 8.68 mmol.

Example 3

Example 1 was repeated to obtain a polymer rubber modified on its both ends, except that (1) the added amount of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 14.9 mmol, (2) tin tetrachloride (coupling agent) was not added, and (3) the added amount of 1,1-dimethoxytrimethylamine (amine compound) was changed to 14.9 mmol.

Example 4

Example 1 was repeated to obtain a polymer rubber modified on its both ends, except that (1) the added amount of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 10.1 mmol, (2) the added amount of tetrahydrofuran was changed to 300 g, (3) the added amount of tin tetrachloride (coupling agent) was changed to 0.32 mmol, and (4) the added amount of 1,1-dimethoxytrimethylamine (amine compound) was changed to 8.8 mmol.

Comparative Example 1

Example 1 was repeated to obtain a modified polymer rubber, except that (1) 11.2 mmol of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 11.0 mmol of n-butyllithium (hexane solution), (2) tin tetrachloride (coupling agent) was not added, and (3) the added amount of 1,1-dimethoxytrimethylamine (amine compound) was changed to 11.0 nmol.

Comparative Example 2

Comparative Example 1 was repeated to obtain a polymer rubber, except that (1) the added amount of n-butyllithium (hexane solution) was changed to 9.4 mmol, (2) the added amount of tetrahydrofuran was changed to 122 g, and (3) tin tetrachloride (coupling agent) and 1,1-dimethoxytrimethylamine (amine compound) were not added.

The following measurements were made regarding the polymer rubber obtained in the above-mentioned Examples 1 to 4 and Comparative Examples 1 and 2. Results thereof are summarized in Table 2.

1. Mooney Viscosity

It was measured at 100° C. according to JIS K-6300.

2. Content of Vinyl Bond

It was measured according to infrared spectroscopic analysis.

3. Content of Styrene Unit

It was measured according to a refractive index method.

4. Impact Resilience of Vulcanized Rubber

It was measured by a method comprising the steps of:

(1) kneading the polymer rubber and components shown in Table 1 in a laboplastomil to obtain a kneaded product, (2) molding the kneaded product with a 6-inch roll to obtain sheet, (3) vulcanizing the sheet by heating at 160° C. for 45 minutes to obtain vulcanized sheet, and (4) measuring a 60° C. impact resilience of the vulcanized sheet with a Luepke resilience tester.

TABLE 1

| Components | Proportion (part by weight) |
| --- | --- |
| Polymer rubber | 100 |
| Silica[*1] | 78.4 |
| Silane coupling agent[*2] | 6.4 |
| Carbon | 6.4 |
| Extender oil[*3] | 47.6 |
| Antioxidant[*4] | 1.5 |
| Zinc white | 2 |
| Vulcanization accelerator[*5] | 1 |
| Vulcanization accelerator[*6] | 1 |
| Wax[*7] | 1.5 |
| Sulfur | 1.4 |

[*1]Trademark of ULTRASIL VN3-G, manufactured by Degussa.
[*2]Si69 manufactured by Deggusa.
[*3]Aroma oil, trademark of X-140, manufactured by Kyodo Oil Co., Ltd.
[*4]Antioxidant, trademark of ANTIGEN 3C, manufactured by Sumitomo Chemical Co., Ltd.
[*5]Vulcanization accelerator, trademark of SOXINOL CZ, manufactured by Sumitomo Chemical Co., Ltd.
[*6]Vulcanization accelerator, trademark of SOXINOL D, manufactured by Sumitomo Chemical Co., Ltd.
[*7]Trademark of SUNNOC N, manufactured by Ouchishinko Chemical Industrial Co., Ltd.

TABLE 2

|  | Example | | | | Comparative Example | |
| --- | --- | --- | --- | --- | --- | --- |
|  | 1 | 2 | 3 | 4 | 1 | 2 |
| Styrene unit content (wt %) | 23 | 22 | 22 | 19 | 23 | 29 |
| Vinyl content (wt %) | 58 | 58 | 58 | 57 | 59 | 42 |
| Mooney viscosity ($ML_{1+4}$100° C.) | 74 | 79 | 47 | 93 | 77 | 66 |
| Compound of formula (1)[*1] | I | I | I | I | — | — |
| Modifier[*2] | II | II | II | II | II | — |
| Impact resilience 60° C., % | 60 | 60 | 60 | 62 | 56 | 51 |

[*1]I: Active saturated or unsaturated hydrocarbon obtained by polymerizing two isoprene monomer units with 3-(N,N-dimethylamino)-1-propyllithium.
[*2]II: 1,1-dimethoxytrimethylamine.

Example 5

Example 1 was repeated to obtain a modified polymer rubber, except that 1,1-dimethoxytrimethylamine (amine compound) was changed to 4'-(imidazol-1-yl)-acetophenone (ketone compound).

Comparative Example 3

Example 1 was repeated to obtain a modified polymer rubber, except that (1) 11.2 mmol of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 9.55 mmol of n-butyllithium (hexane solution), (2) the added amount of tetrahydrofuran was changed to 122 g, (3) the added amount of tin tetrachloride (coupling agent) was changed to 0.57 mmol, and (4) 9.6 mmol of 1,1-dimethoxytrimethylamine (amine compound) was changed to 7.2 mmol of 4'-(imidazol-1-yl)-acetophenone (ketone compound).

Comparative Example 4

Comparative Example 3 was repeated to obtain a modified polymer rubber, except that (1) the added amount of n-butyllithium (hexane solution) was changed to 9.80 mmol, (2) the added amount of tetrahydrofuran was changed to 324 g, (3) the added amount of tin tetrachloride (coupling agent) was changed to 0.39 mmol, and (4) the added amount of 4'-(imidazol-1-yl)-acetophenone (ketone compound) was changed to 8.33 mmol.

The above-mentioned measurements were made regarding the polymer rubber obtained in the above-mentioned Example 5 and Comparative Examples 2, 3 and 4. Results thereof are summarized in Table 3.

TABLE 3

|  | Example 5 | Comparative Example 3 | Comparative Example 4 | Comparative Example 2 |
|---|---|---|---|---|
| Styrene unit content (wt %) | 23 | 29 | 22 | 29 |
| Vinyl content (wt %) | 59 | 42 | 58 | 42 |
| Mooney viscosity (ML$_{1+4}$100° C.) | 75 | 67 | 70 | 66 |
| Compound of formula (1)*[1] | I | — | — | — |
| Modifier*[2] | II | II | II | — |
| Impact resilience 60° C., % | 61 | 55 | 57 | 51 |

*[1]I: Active saturated or unsaturated hydrocarbon obtained by polymerizing two isoprene monomer units with 3-(N,N-dimethylamino)-1-propyllithium.
*[2]II: 4'-(imidazol-1-yl)-acetophenone.

Example 6

Example 1 was repeated to obtain a modified polymer rubber, except that 1,1-dimethoxytrimethylamine (amine compound) was changed to N,N-dimethylaminopropylacrylamide (acrylamide compound).

Comparative Example 5

Example 1 was repeated to obtain a modified polymer rubber, except that (1) 11.2 mmol of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 12.5 mmol of n-butyllithium (hexane solution), (2) the added amount of tin tetrachloride (coupling agent) was changed to 1.63 mmol, and (3) 9.6 mmol of 1,1-dimethoxytrimethylamine (amine compound) was changed to 5.63 mmol of N,N-dimethylaminopropylacrylamide (acrylamide compound).

The above-mentioned measurements were made regarding the polymer rubber obtained in the above-mentioned Example 6 and Comparative Examples 2, and 5. Results thereof are summarized in

TABLE 4

|  | Example 6 | Comparative Example 5 | Comparative Example 2 |
|---|---|---|---|
| Styrene unit content (wt %) | 23 | 22 | 29 |
| Vinyl content (wt %) | 58 | 58 | 42 |
| Mooney viscosity (ML$_{1+4}$100° C.) | 75 | 72 | 66 |
| Compound of formula (1)*[1] | I | — | — |
| Modifier*[2] | II | II | — |
| Impact resilience 60° C., % | 60 | 56 | 51 |

*[1]I: Active saturated or unsaturated hydrocarbon obtained by polymerizing two isoprene monomer units with 3-(N,N-dimethylamino)-1-propyllithium.
*[2]II: N,N-dimethylaminopropylacrylamide.

Example 7

Example 1 was repeated to obtain a modified polymer rubber, except that (1) the added amount of tin tetrachloride (coupling agent) was changed to 0.22 mmol, and (2) 9.6 mmol of 1,1-dimethoxytrimethylamine (amine compound) was changed to 10.3 mmol of 1,3-dimethyl-2-imidazolidinone (heterocyclic compound).

Example 8

Example 7 was repeated to obtain a modified polymer rubber, except that (1) the added amount of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 9.72 mmol, (2) tin tetrachloride (coupling agent) was not added, and (3) the added amount of 1,3-dimethyl-2-imidazolidinone (heterocyclic compound) was changed to 9.72 mmol.

Comparative Example 6

Example 1 was repeated to obtain a modified polymer rubber, except that (1) 11.2 mmol of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 9.90 mmol of n-butyllithium (hexane solution), (2) the added amount of tin tetrachloride (coupling agent) was changed to 0.50 mmol, and (3) 9.6 mmol of 1,1-dimethoxytrimethylamine (amine compound) was changed to 7.52 mmol of 1,3-dimethyl-2-imidazolidinone (heterocyclic compound).

The above-mentioned measurements were made regarding the polymer rubber obtained in the above-mentioned Examples 7 and 8 and Comparative Examples 2, and 6. Results thereof are summarized in Table 5.

TABLE 5

|  | Example | | Comparative Example | |
|---|---|---|---|---|
|  | 7 | 8 | 6 | 2 |
| Styrene unit content (wt %) | 22 | 22 | 22 | 29 |
| Vinyl content (wt %) | 58 | 60 | 58 | 42 |
| Mooney viscosity (ML$_{1+4}$100° C.) | 71 | 99 | 69 | 66 |
| Compound of formula (1)*¹ | I | I | — | — |
| Modifier*² | II | II | II | — |
| Impact resilience 60° C., % | 65 | 65 | 56 | 51 |

*¹I: Active saturated or unsaturated hydrocarbon obtained by polymerizing two isoprene monomer units with 3-(N,N-dimethylamino)-1-propyllithium.
*²II: 1,3-dimethyl-2-imidazolidinone.

Example 9

Example 1 was repeated to obtain a modified polymer rubber, except that (1) the added amount of tin tetrachloride (coupling agent) was changed to 0.22 mmol, and (2) 9.6 mmol of 1,1-dimethoxytrimethylamine (amine compound) was changed to 10.3 mmol of 3-glycidoxypropyltrimethoxysilane (silyl compound).

Example 10

Example 9 was repeated to obtain a modified polymer rubber, except that (1) the added amount of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 12.4 mmol, (2) 0.22 mmol of tin tetrachloride (coupling agent) was changed to 0.25 mmol of silicon tetrachloride, and (3) the added amount of 3-glycidoxypropyltrimethoxysilane (silyl compound) was changed to 11.4 mmol.

Comparative Example 7

Example 1 was repeated to obtain a modified polymer rubber, except that (1) 11.2 mmol of the active saturated or unsaturated hydrocarbon obtained by polymerizing two isoprene monomer units with 3-(N,N-dimethylamino)-1-propyllithium (AI-200 CE, produced by FMC Lithium, cyclohexane solution) was changed to 10.50 mmol of n-butyllithium (hexane solution), (2) the added amount of tin tetrachloride (coupling agent) was changed to 0.42 mmol, and (3) 9.6 mmol of 1,1-dimethoxytrimethylamine (amine compound) was changed to 8.82 mmol of 3-glycidoxypropyltrimethoxysilane (silyl compound).

The above-mentioned measurements were made regarding the polymer rubber obtained in the above-mentioned Examples 9 and 10 and Comparative Examples 2, and 7. Results thereof are summarized in Table 6.

TABLE 6

|  | Example | | Comparative Example | |
|---|---|---|---|---|
|  | 9 | 10 | 7 | 2 |
| Styrene unit content (wt %) | 23 | 23 | 23 | 29 |
| Vinyl content (wt %) | 59 | 58 | 60 | 42 |
| Mooney viscosity) | 77 | 61 | 71 | 66 |
| (ML$_{1+4}$100° C. | | | | |
| Compound of formula (1)*¹ | I | I | — | — |
| Modifier*² | II | II | II | — |
| Impact resilience 60° C., % | 68 | 65 | 60 | 51 |

*¹I: Active saturated or unsaturated hydrocarbon obtained by polymerizing two isoprene monomer units with 3-(N,N-dimethylamino)-1-propyllithium.
*²II: 3-glycidoxypropyltrimethoxy silane.

The invention claimed is:

1. A process for producing a both end-modified diene polymer rubber comprising the steps of:
   (1) polymerizing a conjugated diene monomer or a combination thereof with an aromatic vinyl monomer in the presence of a compound represented by the following formula (1) to produce an alkali metal end-carrying active polymer, and
   (2) reacting the alkali metal end-carrying active polymer with an amine compound, a ketone compound, an acrylamide compound or a silyl compound represented by the following formulas (2), (3), (4) and (6), respectively,

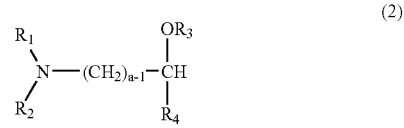

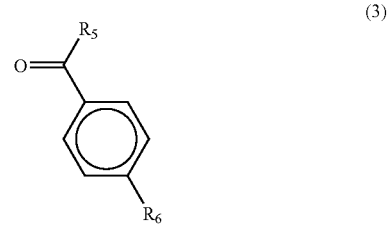

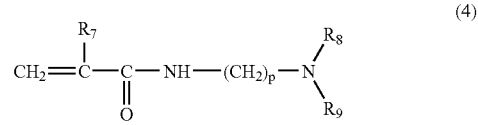

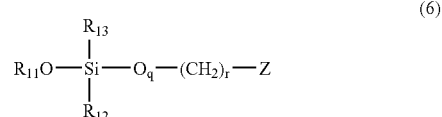

wherein, in the formula (1), R is a functional group containing a substituent group-carrying nitrogen atom, X is a saturated or unsaturated hydrocarbon group comprising from 0 to 10 conjugated diene monomer units or aromatic vinyl monomer units, n is an integer of from 1 to 10, and M is an alkali metal; in the formula (2), each of R$_1$, R$_2$ and R$_3$ is independently of each other an alkyl group having from 1 to 8 carbon atoms, R$_4$ is an alkoxy or alkyl group having from 1 to 8 carbon atoms, and a is an integer of from 1 to 8; in the formula (3), R$_5$ is selected from the group consisting of methyl, ethyl, propyl, and butyl, and R$_6$ is selected from the group consisting of morpholino, imidazolyl, pyrazolyl, oxazolyl, thiazolyl, pyridinyl, pyrimidinyl, and pyrazinyl; in the formula (4), $R_7$ is hydrogen or a methyl group, each of $R_8$ and $R_9$ is independently of each other an alkyl group, and p is an integer of from 1 to 10; and, in the formula (6), $R_{11}$ is an alkyl group having from 1 to 4 carbon atoms, a cycloalkyl group, a phenyl group or a benzyl group, each of $R_{12}$ and $R_{13}$ is independently of each other an alkyl group having from 1 to 4 carbon atoms, an alkoxy group, an alkoxyalkyl group, a cycloalkyl group, a phenyl group or a benzyl group, q is an integer of from 0 to 1, r is an integer of from 1 to 5, and Z is a halogen or a vinyl group.

2. The process for producing a both end-modified diene polymer rubber according to claim 1, wherein the compound reacted with the alkali metal end-carrying active polymer contains an amine compound represented by the formula (2).

3. The process for producing a both end-modified diene polymer rubber according to claim 1, wherein the compound reacted with the alkali metal end-carrying active polymer contains a ketone compound represented by the formula (3).

4. The process for producing a both end-modified diene polymer rubber according to claim 1, wherein the compound reacted with the alkali metal end-carrying active polymer contains an acrylamide compound represented by the formula (4).

5. The process for producing a both end-modified diene polymer rubber according to claim 1, wherein the compound reacted with the alkali metal end-carrying active polymer contains a silyl compound represented by the formula (6).

6. The process for producing a both end-modified diene polymer rubber according to claim 1, wherein the R in the formula (1) is an N,N-dimethylamino group, an N,N-diethylamino group, an N,N-dipropylamino group, an N,N-dibutylamino group, a morpholino group or an imidazolyl group.

7. The process for producing a both end-modified diene polymer rubber according to claim 1, wherein in the formula (1), X is a saturated or unsaturated hydrocarbon group comprising from 1 to 5 conjugated diene monomer units or aromatic vinyl monomer units.

8. The process for producing a both end-modified diene polymer rubber according to claim 1, wherein the n in the formula (1) is an integer of from 3 to 10.

9. The process for producing a both end-modified diene polymer rubber according to claim 1, wherein the X in the formula (1) is a saturated or unsaturated hydrocarbon group comprising two isoprene monomer units.

10. The process for producing a both end-modified diene polymer rubber according to claim 1, wherein the M in the formula (1) is Li.

11. The process for producing a both end-modified diene polymer rubber according to claim 1, wherein, in the formula (2), each of the $R_1$ and the $R_2$ is a methyl group, the $R_3$ is a methyl, ethyl, propyl or butyl group, the $R_4$ is a methoxy, ethoxy, propoxy or butoxy group, and the a is 1.

12. The process for producing a both end-modified diene polymer rubber according to claim 1, wherein, in the formula (3), the $R_6$ is a morpholino group or an imidazolyl group.

13. The process for producing a both end-modified diene polymer rubber according to claim 1, wherein, in the formula (4), the $R_7$ is hydrogen or a methyl group, each of the $R_8$ and the $R_9$ is independently of each other an alkyl group having from 2 to 4 carbon atoms, the p is an integer of from 2 to 5.

14. The process for producing a both end-modified diene polymer rubber according to claim 1, wherein, in the formula (6), the $R_{11}$ is an alkyl group having from 1 to 4 carbon atoms, and each of the $R_{12}$ and the $R_{13}$ is independently of each other an alkoxy group having from 1 to 4 carbon atoms.

15. The process for producing a both end-modified diene polymer rubber according to claim 1, wherein the alkali metal end-carrying active polymer is reacted with the amine compound, the ketone compound, or the acrylamide compound represented in formulas (2) to (4), respectively.

* * * * *